(12) United States Patent
Hulet et al.

(10) Patent No.: US 9,330,486 B1
(45) Date of Patent: May 3, 2016

(54) OPTIMIZATIONS OF THREE-DIMENSIONAL (3D) GEOMETRY

(71) Applicant: LOCKHEED MARTIN CORPORATION, Bethesda, MD (US)

(72) Inventors: Scott S. Hulet, Wadsworth, OH (US); Dave Foster, North Canton, OH (US); Brian Michael Ames, Mogadore, OH (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 388 days.

(21) Appl. No.: 13/669,745

(22) Filed: Nov. 6, 2012

Related U.S. Application Data

(60) Provisional application No. 61/680,425, filed on Aug. 7, 2012.

(51) Int. Cl.
*G06T 15/00* (2011.01)
*G06T 15/10* (2011.01)

(52) U.S. Cl.
CPC .................................... *G06T 15/10* (2013.01)

(58) Field of Classification Search
USPC ......................................................... 345/419
See application file for complete search history.

(56) References Cited

U.S. PATENT DOCUMENTS

2010/0201682 A1\* 8/2010 Quan et al. .................... 345/419
2013/0155058 A1\* 6/2013 Golparvar-Fard et al. .... 345/419

\* cited by examiner

*Primary Examiner* — Kimbinh T Nguyen
(74) *Attorney, Agent, or Firm* — Terry M. Sanks, Esq.; Beusse Wolter Sanks & Maire, PLLC

(57) ABSTRACT

A computer can identify discrete objects within a 3D geometry in a vector-based format. The computer can compare a spatial property of each of the discrete objects against an established spatial range. From the comparing, the computer can determining that a set of the discrete objects have a spatial property within the spatial range. The computer can omit the discrete objects from the 3D geometry as a group to create an altered 3D geometry. The computer can submit the altered 3D geometry to a render engine for display. The number of polygons in the altered 3D geometry is less than the number of polygon faces in the 3D geometry.

20 Claims, 13 Drawing Sheets

10

20

30

400A

400C

OPTIMIZATIONS OF THREE-DIMENSIONAL (3D) GEOMETRY

CROSS-REFERENCE TO RELATED APPLICATIONS

This application claims the benefit of U.S. Provisional Application No. 61/680,425 filed Aug. 7, 2012, and incorporated herein by reference in its entirety.

BACKGROUND

Embodiments relate to an automatic process to optimize geometry and texture data for graphics/rendering engines by reorganizing the data to cull and batch more efficiently.

In computer graphics, real-world objects may be represented as three-dimensional (3D) geometric models 10, as shown in FIG. 1. Conventional geometric models 20 may be defined in computer code as a hierarchy of nodes, as shown in FIG. 2. A variety of node types, each with distinct attributes, may define the model. The geometric model 20 may contain a group node. Each group node may include object nodes and other group nodes. Each object node may include, but not limited to, polygons. The surface of a 3D object may be defined by a collection of polygons. Polygons may be defined by their vertices at 3D coordinates. Objects may be grouped with other objects or other groups. Some nodes may control the position or visibility of the nodes below them in the hierarchy. Textures may be bitmap images applied to the polygon. Textures may vary the color or other attributes across the surface of a polygon. As may be appreciated, 3D geometric models may have many configurations.

Referring now to FIG. 3, a conventional scene graph 30 is shown. A scene graph 30 may be a data structure that defines the logical and spatial representation of a graphical scene. It may include the positions and orientation of all individual geometric models. The hierarchy of nodes within individual model files may be considered an extension of the scene graph. The scene graph 30 may also include cameras, lights, and other parameters necessary to define a scene. Incrementally changing the position of the camera or individual models over time may create the illusion of movement within the scene.

In the scene graph 30, there may be, but not limited to, a model for building 1, a model for building 2, a model for a car, a model for tree 1 and a model for tree 2.

BRIEF SUMMARY

Embodiments relate to a system, method, and a computer-program product. The method comprises identifying, by one or more processors, discrete objects within a three-dimensional (3D) geometry in a vector-based format. The method further comprises comparing, by the one or more processors, a spatial property of each of the discrete objects against an established spatial range, and determining, by the one or more processors, that a plurality of the discrete objects have a spatial property within the spatial range. The method also comprises omitting, by the one or more processors, the discrete objects from the 3D geometry as a group to create an altered 3D geometry, and submitting, by the one or more processors, the altered 3D geometry to a rendering engine for display. A number of polygons in the altered 3D geometry are less than the number of polygon faces in the 3D geometry.

The computer-program product is tangibly embodied in a non-transitory machine-readable storage medium. The computer-program product including instructions configured to cause a data processing apparatus to identify discrete objects within a 3D geometry in a vector-based format, and compare a largest dimension of each of the discrete objects against an established spatial range. The instructions are also configured to cause the data processing apparatus to determine, from the compared, that a plurality of the discrete objects have a spatial property within the spatial range, omit the discrete objects from the 3D geometry as a group to create an altered 3D geometry, and submit the altered 3D geometry to a rendering engine for display, wherein a number of polygons in the altered 3D geometry is less than the number of polygon faces in the 3D geometry.

The system comprises one or more processors, one or more computer-readable memories and one or more computer-readable, tangible storage devices, program instructions, stored on at least one of the one or more storage devices for execution by at least one of the one or more processors via at least one of the one or more memories, to identify discrete objects within a 3D scene having a scene graphs, and program instructions, stored on at least one of the one or more storage devices for execution by at least one of the one or more processors via at least one of the one or more memories, to compare a largest dimension of each of the discrete objects against an established spatial range. The system further comprises program instructions, stored on at least one of the one or more storage devices for execution by at least one of the one or more processors via at least one of the one or more memories, to determine, from the comparing, that a plurality of the discrete objects have a spatial property within the spatial range, program instructions, stored on at least one of the one or more storage devices for execution by at least one of the one or more processors via at least one of the one or more memories, to omit the discrete objects from the 3D scene as a group to create an altered 3D scene, and program instructions, stored on at least one of the one or more storage devices for execution by at least one of the one or more processors via at least one of the one or more memories, to submit the altered 3D scene for display, wherein a number of polygons in the altered 3D scene is less than the number of polygon faces in the 3D scene.

DETAILED DESCRIPTION

Figure 1:
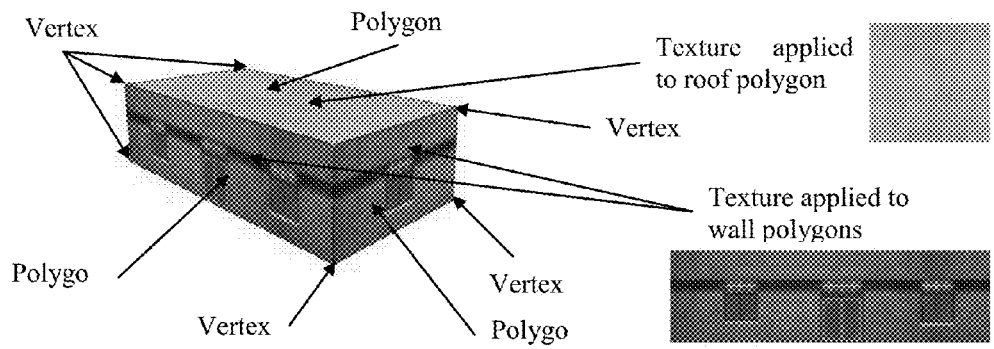
FIG. 1 identifies vertices, polygons, and textures on a conventional three-dimensional (3D) model.
Figure 2:
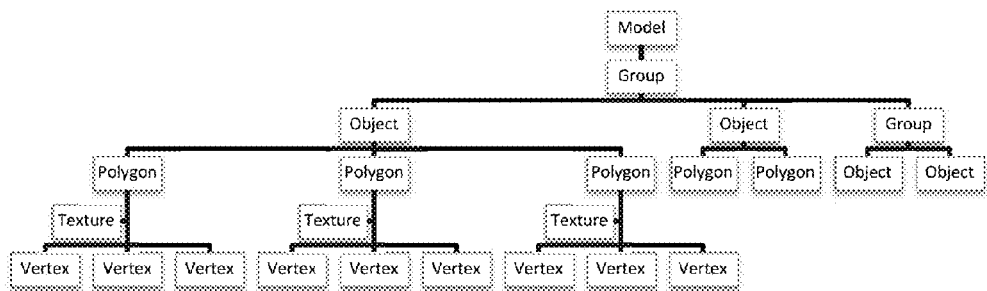
FIG. 2 shows the hierarchy of a conventional 3D model.

Reference will be made below in detail to embodiments, which are illustrated in the accompanying drawings. Wherever possible, the same reference numerals used throughout the drawings refer to the same or like parts. The accompanying drawings are included to provide a further understanding of the invention, and are incorporated in and constitute a part of this specification. It is to be understood that the various features of the embodiments disclosed in this specification and in the drawings can be used in any and all combinations.

Embodiments described herein define spatial constraints (e.g., area constraints, maximum dimension constraints, etc.) on objects within a three-dimensional (3D) geometry. Objects within a 3D geometry may be algorithmically separated, grouped based on size, binned with other objects that share similar spatial area/size, and discarded at a range that does not compromise fidelity of an overall scene (i.e., many polygons may be discarded as soon as possible, without introducing negative artifacts in the simulation). For example, in a 3D model of a building, objects able to be selectively separated, grouped, and omitted include, but are not limited to, gutters, air conditioning units, trim, awnings, building wings, tanks, signs, walls, and the like.

Figure 4:
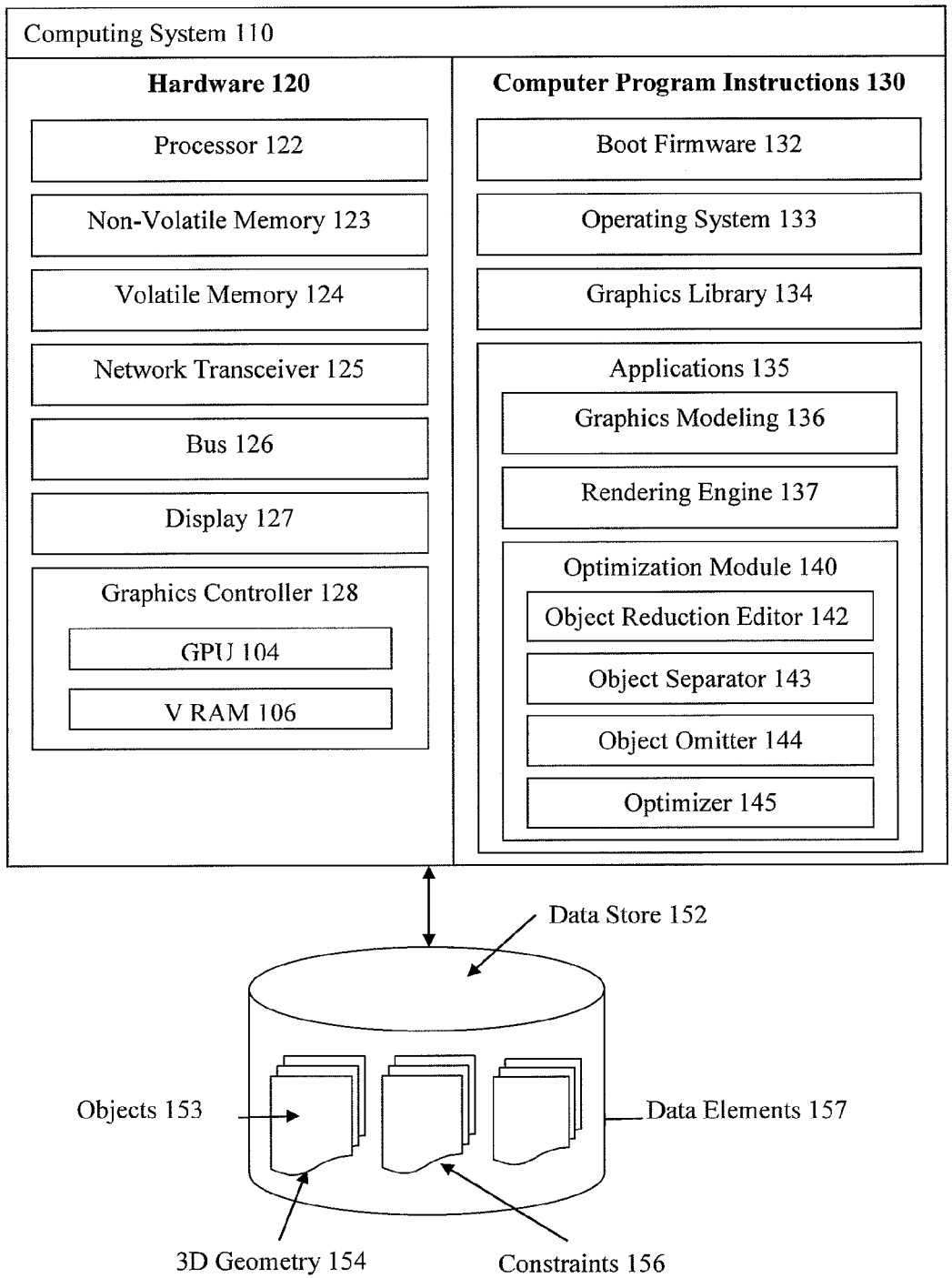
FIG. 4 shows a computing system for optimizing 3D geometries with reduced complexity in accordance with an embodiment.

Referring to the figures, FIG. 4 shows a computing system 110 for optimizing 3D geometries with reduced complexity in accordance with an embodiment. The computing system 110 may include hardware 120 and computer program instructions 130 stored on one or more storage devices or memory. The computer program instructions 130 may execute on the one or more processors 122.

Figure 3:
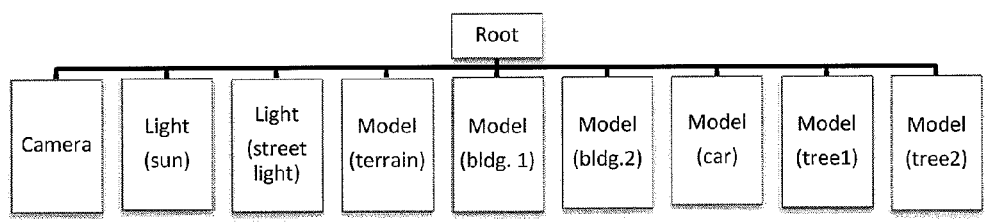
FIG. 3 shows the hierarchy of a conventional scene graph.

A scene graph (e.g., scene graph 30 of FIG. 3), as used herein, may be a structure that arranges the logical and often (but not necessarily) spatial representation of a graphical scene. A scene graph may be a collection of nodes in a graph or tree structure. A node may have many children but may only a single parent, with the effect of a parent applied to all its child nodes. An operation performed on a group may automatically propagate its effect to all of its members.

In an embodiment, 3D geometry 154 of a scene graph may be optimized for rendering engines 137. In one embodiment, these optimizations may be executed offline, prior to graphics rendering. Other embodiments are contemplated, such as adapting one or more of the optimizations detailed herein for real-time visual presentation. The optimizer 145 may include, by way of non-limiting example, functions for the generation and manipulation of hierarchical scene graphs, scene processing (simulation, intersection, culling, and drawing tasks), level-of-detail (LOD) management, asynchronous database paging, dynamic coordinate systems, environment models, light points, and the like.

As used herein, the computing system 110 may include general purpose computing devices, such as, by way of non-limiting example, personal computers, servers, in-vehicle computers, and the like. In various embodiments, computing device(s) may be implemented as stand-alone devices, as virtual devices, as distributed devices, as cooperative devices, and the like.

The hardware 120 may include at least one processor 122, a non-volatile memory 123, a volatile memory 124, a network transceiver 125, a bus 126, a display 127, a graphics controller 128 and/or other such components. The graphics controller 128 may include a graphics processing unit (GPU) 104 and graphic memory, such as, by way of non-limiting example, video RAM 106. One or more data stores, such as, by way of non-limiting example, data store 152, may be considered part of the hardware 120. Alternatively, the hardware 120 may be communicatively linked to remotely stored information on data store 152.

The computer program instructions 130 may include boot firmware 132 (e.g., basic input/output system (BIOS)), an optional operating system 133, graphics library 134, and applications 135. One of the applications 135 may be a graphics modeling application 136. The rendering engine 137 may be on the same computing system or a different computing system connected to the data store 152 containing the 3D geometry 154.

The graphics library 134 may represent an application program interface (API) for computer graphics and/or computer modeling. The graphics library 134 may be one supported by the graphics controller 128.

The graphics modeling application 136 may include applications configured, but not limited to, create, edit, or render graphical objects in three or more dimensions. That is, graphics modeling application 136 may present 3D geometry 154 in a graphical user interface. The graphics modeling application 136 may include dedicated programs, an application component, a scene description language application, and the like.

The rendering engine 137 may generate two-dimensional (2D) video frames to be displayed on display 127 based on the parameters and 3D geometry 154 defined in the scene graph.

A rendering engine 137 may be configured to traverse the scene graph at regular intervals, by way of non-limiting example 30 or 60 times per second, generating frames of video to be displayed on a display 127. Based on the current position of the camera, the position of the individual models, the textures applied to the models, and the direction of the lights, the rendering engine 137 may be configured to calculate the color of each pixel in a frame. A frame may be a 2D representation of the scene from the camera's point of view at a given time. The rendering engine 137 may calculate which objects are in the field of view, which objects are in front of others, how large objects appear relative to others based on their distance from the camera, which surfaces are light or dark based on the position and intensity of the light sources, and many other calculations required to draw a 3D scene on a 2D screen.

In an embodiment, the rendering engine 137 may be configured to process 3D geometry with the same state attributes together in batches. As the rendering engine 137 traverses the scene graph, the engine 137 may start a new batch each time it encounters a different model, or texture, or other state change.

The object reduction editor 142 may provide a user interface permitting an authorized user to change values of the constraints 156 and/or data elements 157.

The object separator 143 may separate one or more objects from a 3D geometry. The object separator 143 may, by way of non-limiting example, group polygons that are connected to each other into separate objects. In one embodiment, the object separator 143 may determine nested relationships between objects in a 3D geometry 154.

The object omitter 144 may remove identified objects from the 3D geometry 154. The removal may be based on spatial constraints and/or ranges of the objects. By way of non-limiting example, all objects bigger than a set value and/or smaller than a set value may be removed, while other objects in the 3D geometry 154 may remain unaffected. The object omitter 144 may remove a group (set of two or more) objects at the same time. The removal may include deleting vertexes from a vertex table, as well as a set of faces, assuming the 3D geometry is in a vector-based format.

Data store 152 may include 3D geometry 154. A 3D geometry 154 may include a set of one or more discrete objects 153. These objects 153 may be nested. In one embodiment, a 3D geometry 154 may be a graphic scene model. Data store 152 may also include data used by graphics optimization module 140, such as user defined constraints 156 for determining how to group discrete objects 153 of a 3D geometry 154. Additional data elements 157 used by object separator 143 and/or object reduction editor 142 may be stored.

Figure 5:
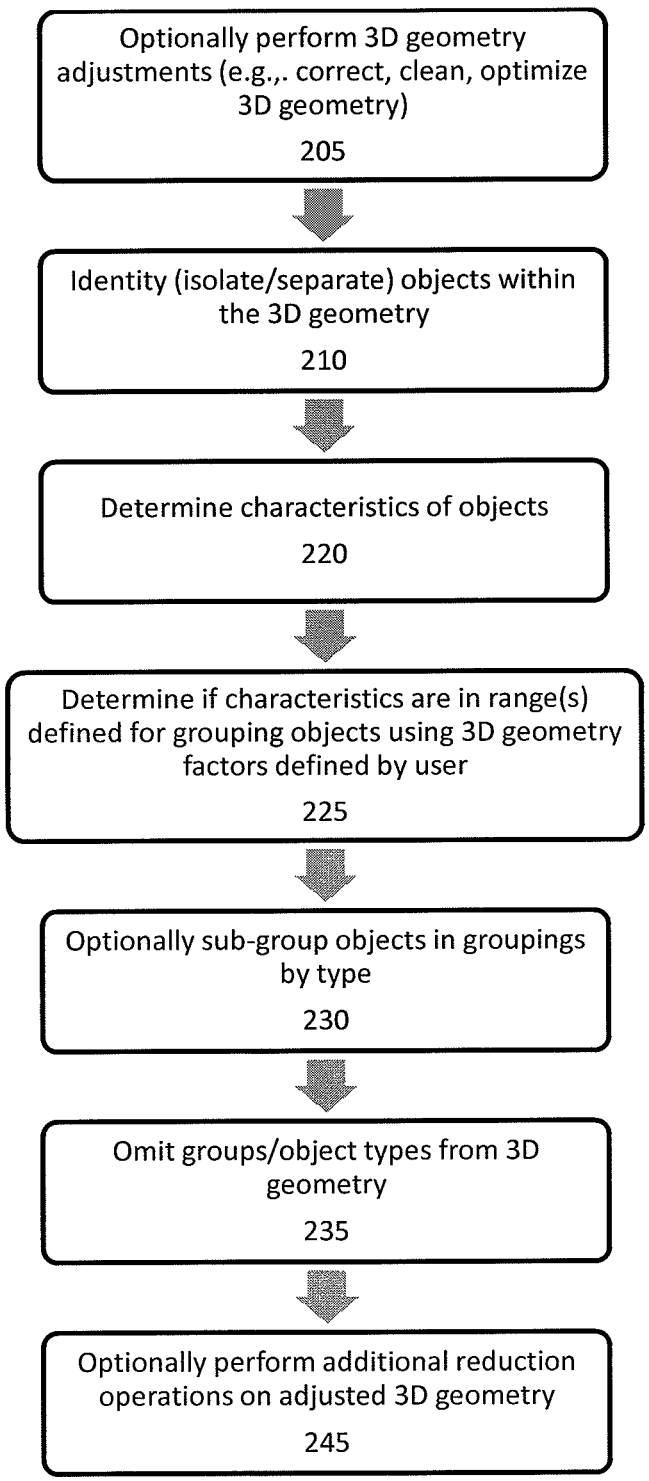
FIG. 5 is a flowchart of a method for reducing a level-of-detail (LOD) of a 3D geometry by selective omission of objects in accordance with an embodiment.
Figure 6A:
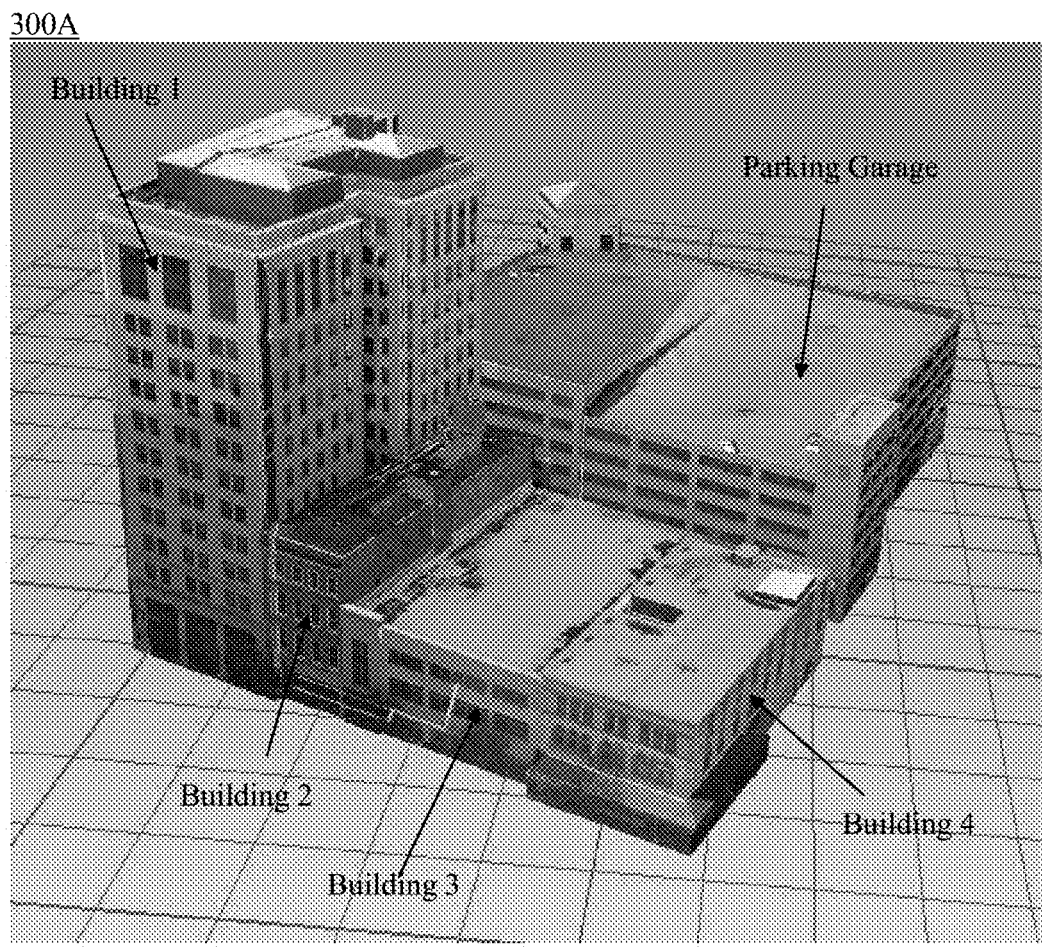
FIGS. 6A-6E illustrate a graphical representation of model complexes with increasingly larger objects deleted at varying LODs in accordance with an embodiment.

FIG. 5 is a flowchart of a method 200 for reducing LODs for a 3D geometry by selective omission of objects in accordance with an embodiment. The method 200 will be described in combination with FIGS. 7A-7D and 6A-6D. FIGS. 7A-7D illustrate block diagrams of progressive hierarchy tree modifications of a model complex graphically represented in FIGS. 6A-6D. FIG. 7A shows a block diagram of a plurality of models initially combined into a model complex 400A where the plurality of models (Building 1, Building 2, Building 3, Building 4 and parking garage) are spatially adjacent to each other and may share texture maps. In an embodiment, two or more smaller models may be combined into a larger model complex 400A which increases the number of polygons that are processed in a batch by the rendering engine and reduces state changes. In an embodiment, the model complex may be one or more models. FIG. 6A illustrates graphical representation of a model complex 600A which is a computer generated image of the scene graph of the block diagram corresponding to the model complex 400A. The graphical representation of the model complex 600A has no items omitted based on LOD omissions.

In step 205, a set of 3D geometry adjustments may be optionally performed on the model complex 400A. These adjustments may include, but are not limited to, slicing non-planar polygons, merging coplanar polygons, deleting cut-outs, deleting hidden vertices, deleting hidden untextured polygons, deleting thin polygons, deleting coincident points, correcting self-intersecting polygons, and/or combining vertices that are close to each other. These adjustments may correct errors in the 3D geometry of the model complex 400A and may reduce the number of polygons and vertices that may be processed by the rendering engine 137 without affecting the level-of-detail (LOD). These optional adjustments may prepare a 3D geometry of the model complex 400A for selective object omission or range-based discard. The functions performed in step 205 may prepare the 3D geometry of the model complex 400A for object separation in one embodiment.

Objects may be identified (by way of non-limiting example, isolated/separated) based on algorithms that may perform vertex and/or polygon adjacency testing in step 210. Polygons that share vertices may be grouped together into objects. This grouping may have the effect of separating non-adjacent polygons into separate objects. In the illustrated example, the model complex includes buildings and architectural features thereof. Thus, the separated objects for this example includes, gutters, air conditioning (AC) units, trim, awnings, building wings, tanks, signs, walls and the like. The separated objects may include other items and would be a function of the details in a particular 3D geometry of a scene graph.

Once the objects have been identified, spatial characteristics of the objects may be determined, as indicated by step 220. These spatial characteristics may include, by way of non-limiting example, a length for the object based on the object's largest dimension. Other characteristics for an object may include an offset height above terrain, object thickness (in any dimension), object aspect ratio, and sub-texture application.

In step 225, the determined characteristics for the objects may be compared against spatial ranges for grouped objects (and/or other geometry factors that are able to be compared to the determined characteristics) using 3D geometry factors. The 3D geometry factors may be defined by a user. A new grouping of objects may be established based on spatial area (localized cluster of building), size characteristics of objects (like sizes, thicknesses, heights, etc.), type of sub-texture applied, type of material applied, object orientation, etc. In one embodiment, LOD ranges may be assigned to LOD nodes in scene-graph structures based on thickness, size, or other spatial characteristics of the associated objects. In embodiments including a scene graph, the determined grouping may be one not normally recorded in the scene graph.

Figure 7A:
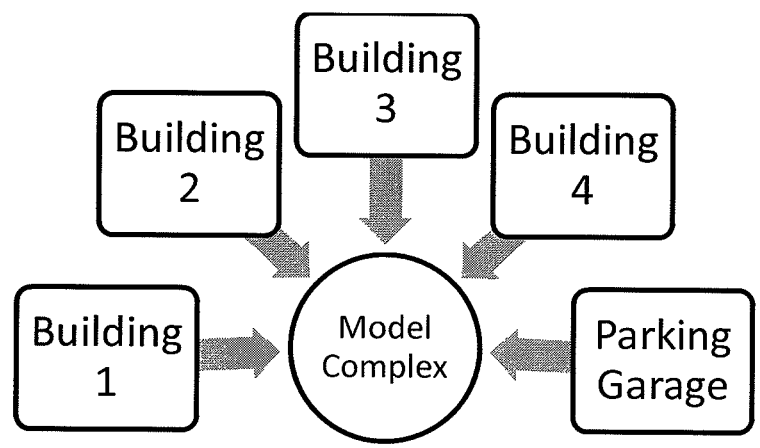
FIG. 7A illustrates a block diagram of a group of models arranged into a model complex for a scene graph in accordance with an embodiment.
Figure 7B:
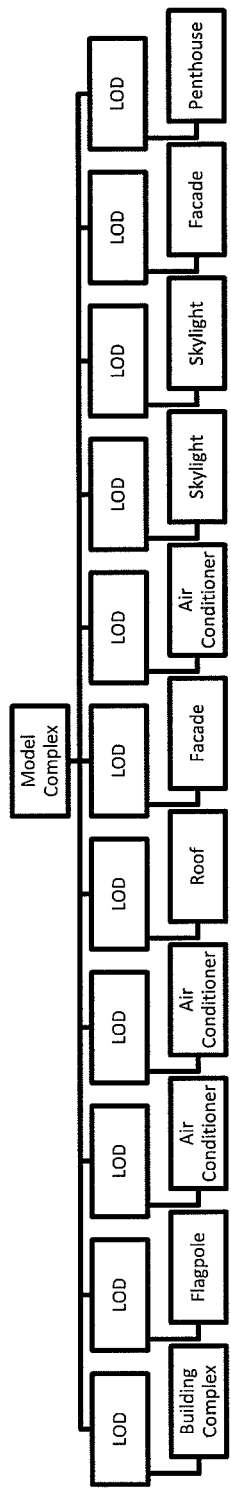
FIG. 7B illustrates a block diagram of a hierarchy tree of model(s)/object(s) separation of the model complex and with LODs in accordance with an embodiment.

FIG. 7B illustrates a block diagram of a hierarchy tree 400B of model(s)/object(s) separation of the model complex and with level-of-detail (LOD) in accordance with an embodiment. In an embodiment, the objects are separated based on size and connectivity. However, objects may be separated based on other parameters. FIG. 7B illustrates a hierarchy tree 400B of model(s)/object(s) after steps 210, 220, and 225 have been performed. Smaller portions or objects of the model complex such as skylights, air conditioners, and a flagpole, have been isolated and separated from the main 3D geometry of the building complex, all of which have been organized in a hierarchy below an LOD node with a range based on the size or characteristics of the geometry. The hierarchy tree 400B allows the smaller objects to be culled from processing as the distance from the viewer increases.

In step 230, optionally one or more sub-groupings of objects in the group may be established. In one embodiment, objects with similar characteristics and LOD ranges are combined, as shown in FIG. 7C, to allow them to be processed together.

Figure 7C:
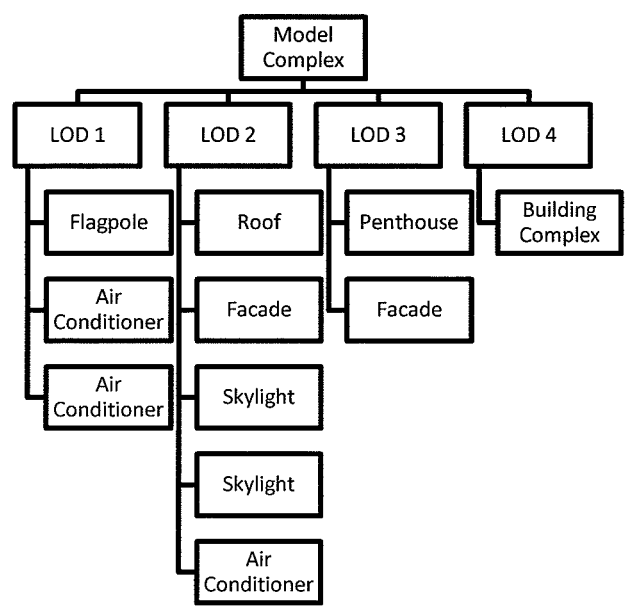
FIG. 7C illustrates a block diagram of a consolidated-LOD hierarchy tree of the model complex in accordance with an embodiment.

FIG. 7C illustrates a block diagram of a consolidated-LOD hierarchy tree 400C in accordance with an embodiment. In FIG. 7C, similar LOD ranges are consolidated. Each level-of-detail may introduce a state change. Forming LOD nodes by combining similar LOD ranges may reduce the number of state changes.

In step 235, with objects grouped by size, or other characteristics, under LOD nodes, objects may be omitted from the scene graph or 3D geometry, and therefore culled from the rendering engine process, as the distance from the viewer increases. Grouping objects by size, then associating those objects with an LOD range, may result in small objects being removed from the scene graph much sooner than large objects.

In step 245, optionally, additional reduction operations may be performed on the adjusted 3D geometry hierarchy tree. The omission of objects may reduce a number of polygon faces of the 3D geometry. This reduction may occur without losing fidelity of non-omitted objects. Reduction actions that do change fidelity may be performed against the adjusted 3D geometry, which may result in a greater reduction in the number of polygon faces in the 3D geometry. Polygons may be sorted by state to reduce state changes and further optimize the geometry for the rendering engine 137. LODs may also be nested to cull geometry more efficiently, as seen in FIG. 7D.

Figure 7D:
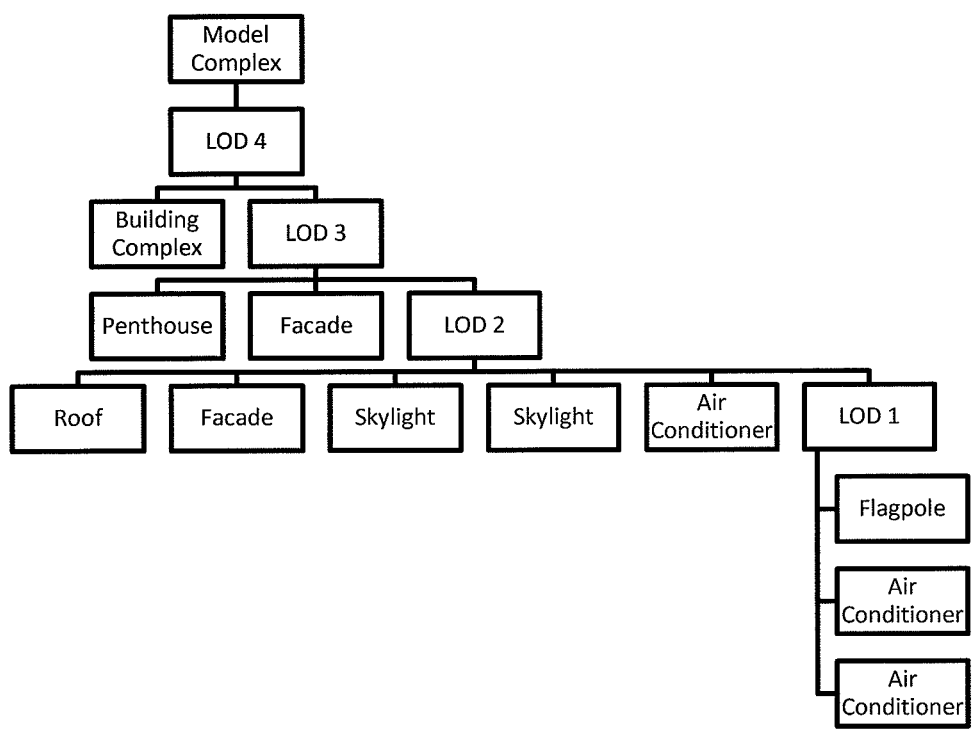
FIG. 7D illustrates a block diagram of a LOD-nested hierarchy tree of the model complex in accordance with an embodiment.

FIG. 7D illustrates a block diagram of LOD-nested hierarchy tree 400D in accordance with an embodiment. In FIG. 7D, the LODs are nested. In one embodiment, the rendering engine 137 may be configured to read the scene graph/model of the LOD nested hierarchy tree 400D down (vertically) first, then across (horizontally). If the distance from the viewer is outside the range defined in an LOD node (LOD 1, LOD 2, LOD 3 or LOD 4), the rendering engine 137 will not continue reading down (vertically) in tree 400D, but will attempt to read across (horizontally). Levels of detail may be nested so that LOD nodes with small ranges are organized within LOD nodes with larger ranges. This may reduce the time the rendering engine 137 spends testing LOD nodes. LOD nodes with smaller ranges may not be tested if such a node is vertically lower in the hierarchy tree 400D rather than across (horizontally).

While the terms "vertically" and "horizontally" are used to represent the direction of nesting of the LOD nested hierarchy tree 400D shown in FIG. 7D, the direction of movement may be based on the ordering or arrangement of the hierarchy tree.

In the example shown in FIG. 7D, LOD node LOD 4 includes an object or model (building complex) and the LOD node LOD 3 where node LOD 3 is smaller in size than node LOD 4. Node LOD 3 includes the models or objects assigned to node LOD 3 and includes the LOD node LOD 2 where node LOD 2 is smaller in size than node LOD 3. LOD Node LOD 2 includes the models or objects assigned to node LOD 2 and includes the node LOD 1 where node LOD 1 is smaller in size than node LOD 2.

Figure 6B:
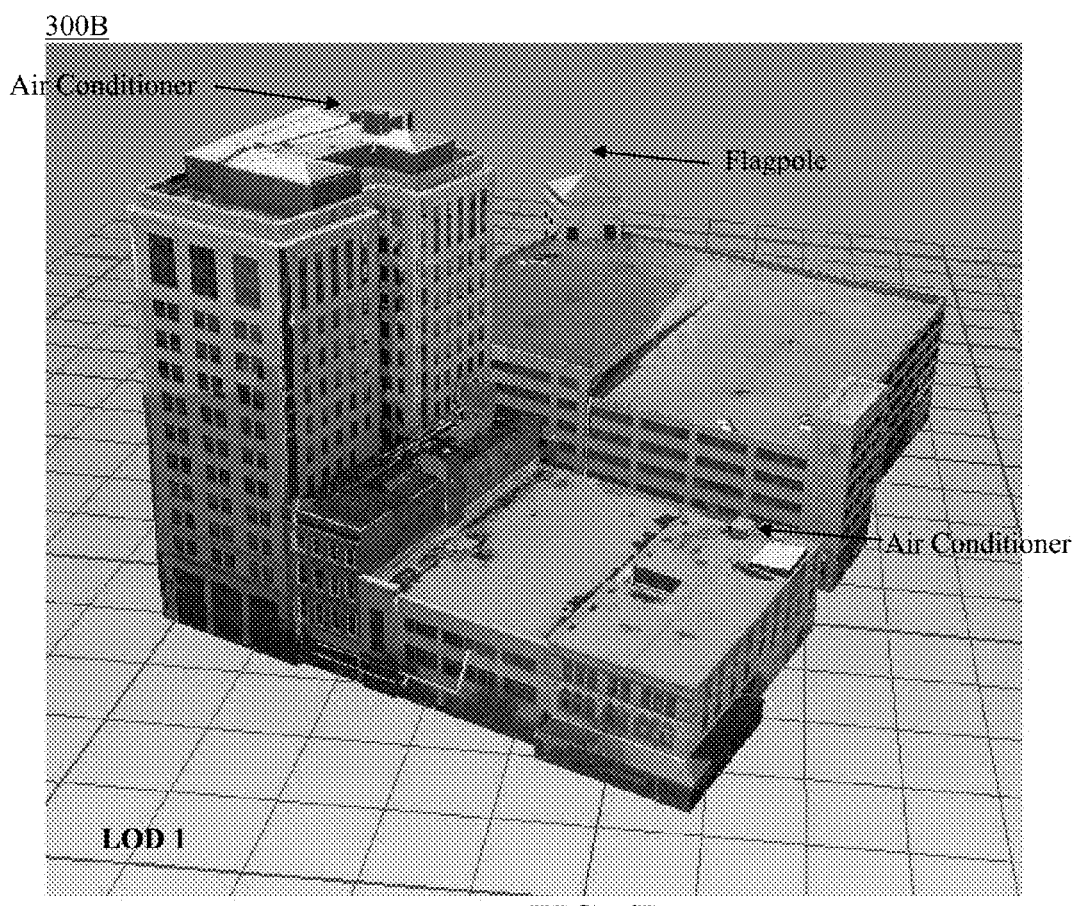
Figure 6C:
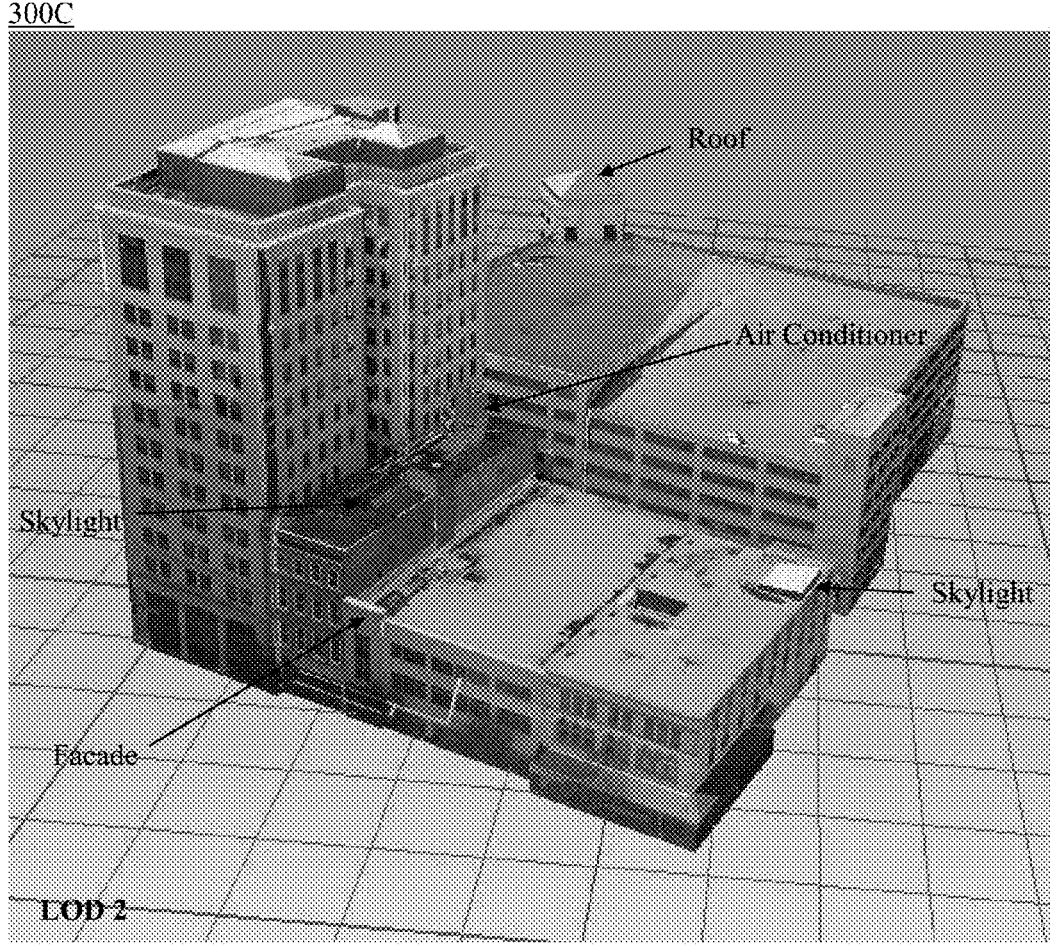
Figure 6D:
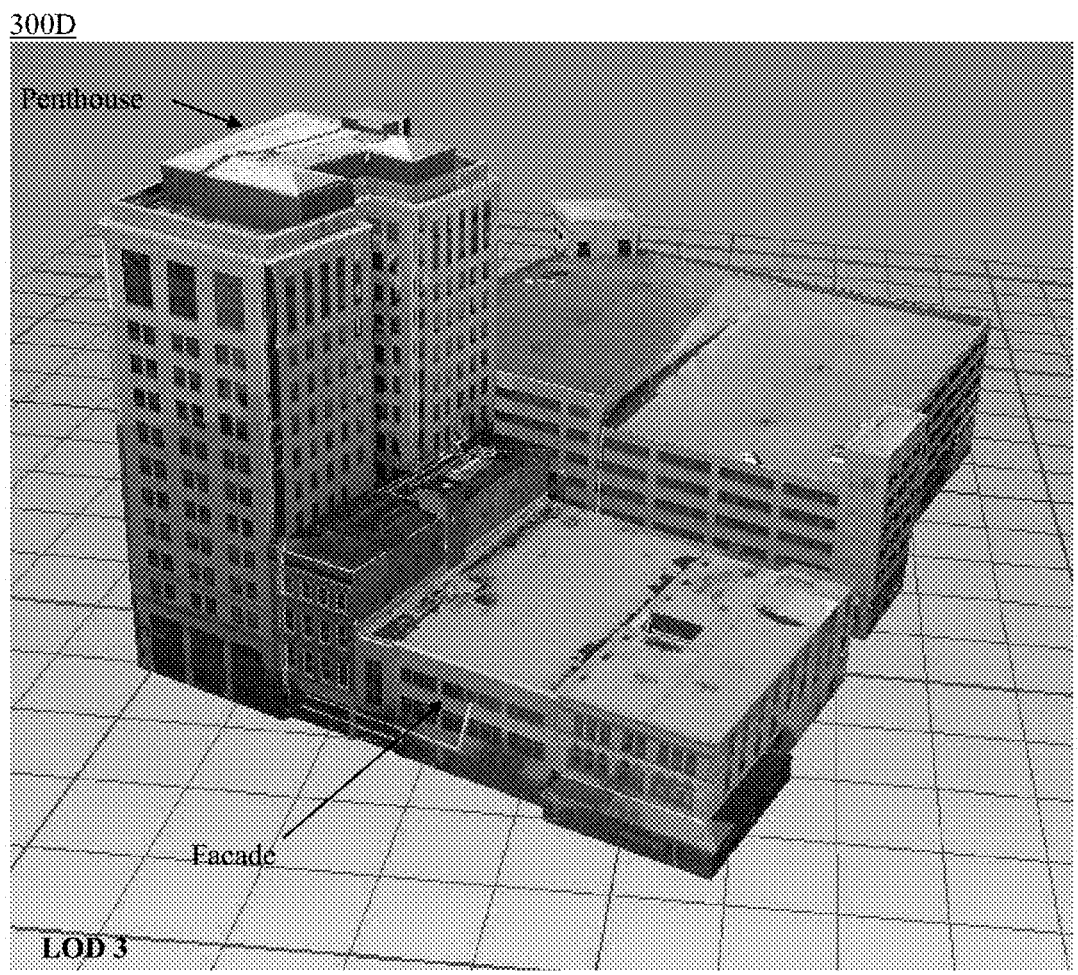
Figure 6E:
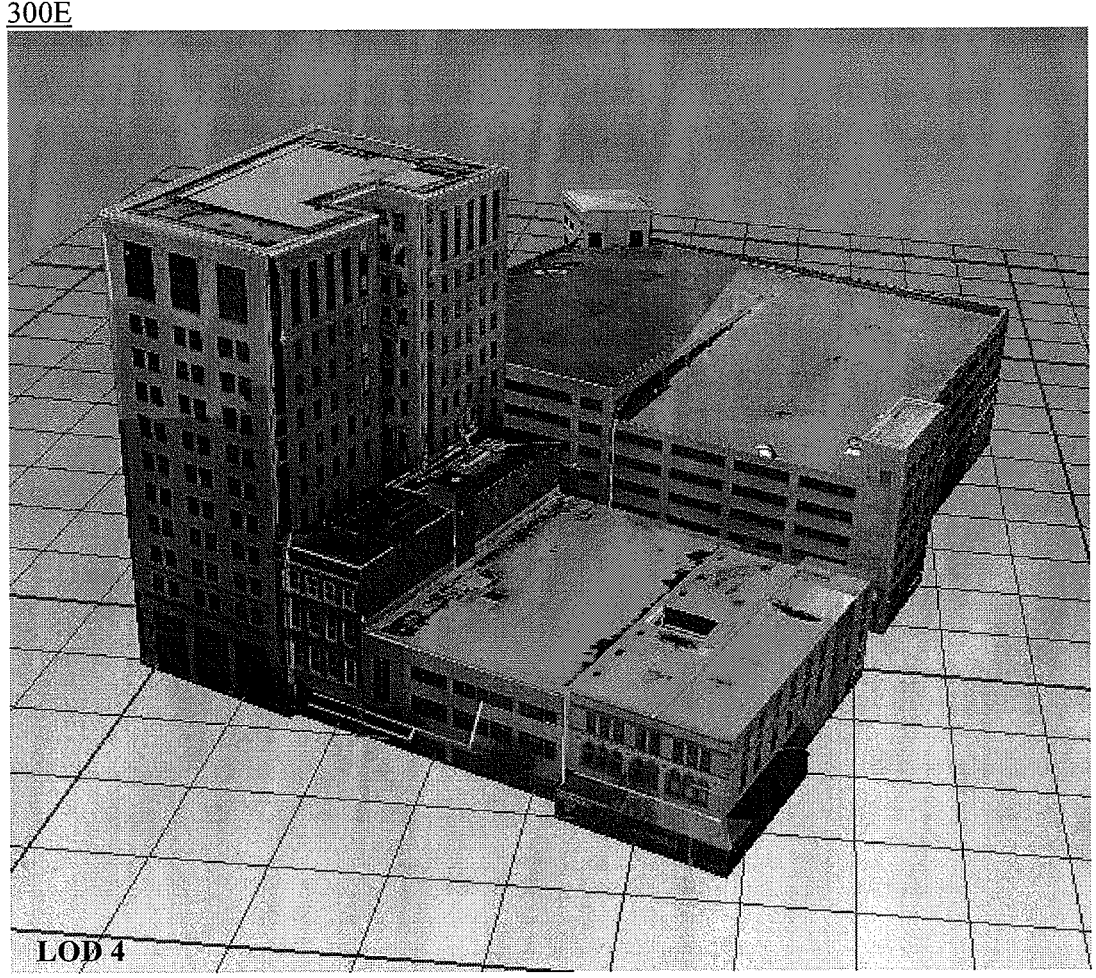

FIG. 6B illustrates a graphical representation of those objects(s)/model(s) in the model complex 300B associated with LOD 1 where objects(s)/model(s) of LOD 1 are annotated. FIG. 6C illustrates a graphical representation of those objects in the model complex 300C associated with node LOD 2 where object(s)/model(s) of node LOD 2 are annotated and object(s)/model(s) of node LOD 1 have been omitted from the graphical representation. FIG. 6D illustrates a graphical representation of those objects(s)/model(s) in the model complex 300D associated with node LOD 3 where objects(s)/model(s) of node LOD 3 are annotated and objects(s)/model(s) of node LODs 1 and 2 have been omitted. FIG. 6E illustrates a graphical representation of those objects(s)/model(s) in the model complex 300E associated with node LOD 4 where objects(s)/model(s) of node LODs 1, 2 and 3 have been omitted. The node LOD 4 corresponds to the building complex.

In an embodiment, method 200 effectuates texture and model optimization which may increase the number of models that may be displayed in a scene without the rendering engine 137 becoming overloaded. The texture and model optimization may include, but is not limited to, combining textures, combining models, cleaning-up geometry, generating levels-of-detail (LOD), and reorganizing the model hierarchy.

In one embodiment, selections of groupings and/or sub-groupings of objects to omit may be made by an authorized user via a graphical user interface. For example, omissions may be based on size/spatial/adjacency testing, so differences between certain types of objects may be algorithmically determined, which may permit isolation, omission, or a setting of attribution for appropriate range-based discards.

The flowchart and block diagrams in FIGS. 4 and 5 illustrate the architecture, functionality, and operation of possible implementations of systems, methods and computer program products according to various embodiments. In this regard, each block in the flowchart or block diagrams may represent a module, segment, or portion of code, which may comprise one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

Aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated for carrying out this invention, but that all embodiments falling within the scope of the appended claims are considered.

What is claimed is:

1. A method, comprising:
   identifying, by one or more processors, discrete objects within an initially provided for three-dimensional (3D) geometry in a vector-based format;
   comparing, by the one or more processors, a spatial property of each of the discrete objects against an established spatial range based on a comparison to a determined characteristic using at least one 3D geometry factor;
   determining, by the one or more processors, that a plurality of the discrete objects have a spatial property within the spatial range;
   omitting, by the one or more processors, the discrete objects from the 3D geometry as a group to create an altered 3D geometry; and
   submitting, by the one or more processors, the altered 3D geometry to a rendering engine for display, wherein a number of polygons in the altered 3D geometry is less than the number of polygon faces in the 3D geometry.

2. The method of claim 1, wherein the spatial property is the largest dimension of said each of the discrete objects, which is compared against an established spatial range for an object dimension.

3. The method of claim 1, further comprising:
   correcting, cleaning, optimizing, by the one or more processors, the 3D geometry by performing at least one of the following: deleting near points in the 3D geometry, slicing thin angles of the 3D geometry, slicing non-planar polygons in the 3D geometry, merging coplanar polygons in the 3D geometry, deleting cutouts in the 3D geometry, deleting hidden vertices in the 3D geometry, deleting hidden untextured polygons in the 3D geometry, and deleting thin polygons in the 3D geometry.

4. The method of claim 1, wherein the spatial range is a range from a threshold value and less so that any discrete objects having a value for the spatial property under the threshold value are in the group that is omitted from the 3D geometry, and wherein those discrete objects having a value for the spatial property greater than the threshold value are included in the 3D geometry.

5. The method of claim 1, Wherein the spatial range is a range from a threshold value and greater so that any discrete objects having a value for the spatial property over the threshold value are in the group that is omitted from the 3D geometry.

6. The method of claim 5, Wherein any discrete objects having a value for the spatial property less than the threshold value are included in the 3D geometry.

7. The method of claim 1, wherein the spatial range is a range between two established thresholds both of which are greater than zero so that discrete objects having a value for the spatial property between the two threshold values are in the group that is omitted from the 3D geometry.

8. The method of claim 1, wherein the 3D geometry comprises a plurality of buildings, wherein the group of omitted discrete objects comprises gutters, signs, AC units, trim, awnings, wings, tanks, walls, or combinations thereof of the buildings.

9. The method of claim 1, wherein the 3D geometry is a scene having an associated scene graph.

10. The method of claim 9, wherein the scene graph does not group the plurality of discrete objects.

11. The method of claim 1, Wherein the plurality of discrete objects are identified and isolated such that polygons that share vertices are grouped together into a discrete object wherein the discrete objects which are omitted as the group to create an altered 3D geometry comprise the plurality of discrete objects.

12. The method of claim 1, wherein the 3D geometry comprises buildings, wherein the method spatially complexes the buildings and performs consolidated omissions of the discrete objects.

13. The method of claim 1, wherein each of the discrete objects are polygon meshes.

14. The method of claim 13, wherein the omitting deletes edges of omitted ones of the polygon meshes that are not shared with one or more polygon meshes of discrete objects present in the altered 3D geometry.

15. A computer-program product, tangibly embodied in a non-transitory machine-readable storage medium, including instructions configured to cause a data processing apparatus to:

identify discrete objects within an originally provided 3D geometry in a vector-based format;
compare a largest dimension of each of the discrete objects against an established spatial range that is based on a comparison to a determined characteristic using at least one 3D geometry factor;
from the comparing, determine that a plurality of the discrete objects have a spatial property within the spatial range;
omit the discrete objects from the 3D geometry as a group to create an altered 3D geometry; and
submit the altered 3D geometry to a rendering engine for display, wherein a number of polygons in the altered 3D geometry is less than the number of polygon faces in the 3D geometry.

16. The computer-program product of claim 15, wherein the 3D geometry is a scene having an associated scene graph, wherein the scene graph does not group the plurality of discrete objects.

17. A system, comprising:
one or more processors, one or more computer-readable memories and one or more computer-readable, tangible storage devices;
program instructions, stored on at least one of the one or more storage devices for execution by at least one of the one or more processors via at least one of the one or more memories, to identify discrete objects within an originally provided 3D scene having a scene graphs;
program instructions, stored on at least one of the one or more storage devices for execution by at least one of the one or more processors via at least one of the one or more memories, to compare a largest dimension of each of the discrete objects against an established spatial range, the spatial range is based on a comparison to a determined characteristic using at least one 3D geometry factor;
program instructions, stored on at least one of the one or more storage devices for execution by at least one of the one or more processors via at least one of the one or more memories, to determine, from the comparing, that a plurality of the discrete objects have a spatial property within the spatial range;
program instructions, stored on at least one of the one or more storage devices for execution by at least one of the one or more processors via at least one of the one or more memories, to omit the discrete objects from the 3D scene as a group to create an altered 3D scene; and
program instructions, stored on at least one of the one or more storage devices for execution by at least one of the one or more processors via at least one of the one or more memories, to submit the altered 3D scene for display, wherein a number of polygons in the altered 3D scene is less than the number of polygon faces in the 3D scene.

18. The system of claim 17, wherein the spatial range is a range from a threshold value and less so that any discrete objects having a value for the spatial property under the threshold value are in the group that is omitted from the 3D geometry, and wherein those discrete objects having a value for the spatial property greater than the threshold value are included in the 3D geometry.

19. The method of claim 17, wherein the plurality of discrete objects are identified and isolated such that polygons that share vertices are grouped together into a discrete object wherein the discrete objects which are omitted from the 3D scene as the group to create an altered 3D scene comprise the plurality of discrete objects.

20. The method of claim 15, wherein the plurality of discrete objects are identified and isolated such that polygons that share vertices are grouped together into a discrete object wherein the discrete objects which are omitted as the group to create an altered 3D geometry comprise the plurality of discrete objects.

* * * * *